United States Patent [19]

Künemund et al.

[11] Patent Number: 5,704,010
[45] Date of Patent: Dec. 30, 1997

[54] ARRANGEMENT FOR RULE DECODING AND EVALUATION FOR A HIGH-RESOLUTION FUZZY INFERENCE PROCESSOR

[75] Inventors: Thomas Künemund, München; Klaus Hentschel, Landshut, both of Germany

[73] Assignee: Siemens Aktiengesellschaft, Munich, Germany

[21] Appl. No.: 617,909

[22] PCT Filed: Sep. 14, 1994

[86] PCT No.: PCT/DE94/01061

§ 371 Date: Mar. 19, 1996

§ 102(e) Date: Mar. 19, 1996

[87] PCT Pub. No.: WO95/08797

PCT Pub. Date: Mar. 30, 1995

[30] Foreign Application Priority Data

Sep. 20, 1993 [DE] Germany .................. 43 31 897.5

[51] Int. Cl.⁶ .................................................. G06G 7/00
[52] U.S. Cl. ........................... 395/3; 395/61; 395/900
[58] Field of Search .................... 395/3, 61, 900, 395/51

[56] References Cited

U.S. PATENT DOCUMENTS

| 5,142,664 | 8/1992 | Zhang | 395/3 |
| 5,371,832 | 12/1994 | Eichfeld et al. | 395/3 |
| 5,412,752 | 5/1995 | Basehore et al. | 395/3 |

FOREIGN PATENT DOCUMENTS

0 513 829  11/1992  European Pat. Off. .......... 9/44

OTHER PUBLICATIONS

"Architecture of a CMOS Fuzzy Logic Controller With Optimized Memory Organization and Operator Design," Eichfeld et al., IEEE Int. Conf. on Fuzzy Systems, Mar. 8–12, 1992, pp. 1317–1323.

"A Fuzzy Inference Coprocessor Using a Flexible Active-Rule-Driven Architecture," Ikeda et al., IEEE Int. Conf. on Fuzzy Systems, Mar. 8–12, 1992, San Diego, CA, pp. 537–544.

Ikeda et al. "A Fuzzy Ingerence Coprocessor Using a Flexible Active-Rule-Driven Architecture" IEEE International Conference on Fuzzy Systems. San Diego, CA pp. 537–544, Mar. 1992.

*Primary Examiner*—Tariq R. Hafiz
*Assistant Examiner*—Jason W. Rhodes
*Attorney, Agent, or Firm*—Hill, Steadman & Simpson

[57] ABSTRACT

The subject of the application relates to an arrangement comprising a rule decoder, a rule evaluation unit and a unit for forming selection signals, to which arrangement, from a fuzzification circuit, a minimum and a maximum number of relevant linguistic values of a respective input variable and values . . . me of membership functions of linguistic values whose numbers lie between the minimum and maximum number, and from a knowledge base memory numbers for linguistic values, prescribed in a plurality of rules, of the respective input variable, can be fed, and processing of these fed numbers and values can be executed simultaneously in parallel with processing of the respective next input variable in the fuzzification circuit. An advantageous refinement of the subject of the application also permits defuzzification running partly simultaneously in parallel with the rule decoding and evaluation.

4 Claims, 5 Drawing Sheets

ARRANGEMENT FOR RULE DECODING AND EVALUATION FOR A HIGH-RESOLUTION FUZZY INFERENCE PROCESSOR

FIELD OF THE INVENTION

The present invention is directed to an arrangement for conducting rule decoding and evaluation in a high-resolution fuzzy inference processor.

DESCRIPTION OF THE PRIOR ART

In the case of fuzzy inference processors having a resolution of, for example, 8 bits, values for the membership functions of the input variables can still be stored without difficulty in a memory. In the case of a resolution of the input variables of more than 8 bits, for example for 10–16 bits, the values of the membership functions of the input variables have to be calculated in the fuzzification circuit from a few corner data, for reasons of storage space. If, because the chip area has to be minimized, there is only a single fuzzification circuit in the fuzzy inference processor, all the input variables have to be calculated there chronologically one after another.

SUMMARY OF THE INVENTION

It is an object of the preceding invention to an arrangement for rule decoding and evaluation which is suitable for a fuzzy inference processor which is optimum from the point of view of processing speed and chip area, which processes input variables chronologically one after another and in which rule decoding and rule evaluation can be carried out largely in parallel with the fuzzification.

The above object is achieved in accordance with the principles of the present invention in an arrangement for rule decoding and evaluation in a fuzzy inference processor, wherein the processor includes a fuzzification unit, a knowledge base memory, and a defuzzification unit, and wherein the inventive arrangement includes a rule decoder, a rule evaluation unit and a unit for forming selection signals. From the fuzzification unit, a minimum number associated with a linguistic value for a given input value is supplied both to the rule decoder and to the unit for forming selection signals. The fuzzification unit also supplies a maximum number of a further linguistic value for the input variable in question to the rule decoder. The fuzzification unit also supplies, to the rule evaluation unit, values of membership functions of linguistic values whose numbers lie in a closed interval between the aforementioned minimum and maximum numbers. The knowledge base memory supplies numbers for linguistic values for the input variable in question, prescribed by a plurality of rules, to the rule decoder as well as to the unit for forming selection signals. In each case, numbers from the plurality of rules are combined into a rule word, and for each input variable, a dedicated signal block with the rule word for that input variable is generated.

In rule decoder, for a given input variable and for the plurality of rules employed, hit signals are generated identifying whether, and if so which of, the rules are fulfilled with regard to the input variable in question. These hit signals are supplied to the unit for forming selection signals. Additionally, the rule decoder, if necessary, generates a mask signal identifying that an input variable does not occur in a rule, and these mask signals are supplied directly from the rule decoder to the rule evaluation unit. The unit for forming selection signals emits selection signals for a given variable formed dependent on the hit signals, the aforementioned minimum and maximum numbers (which are supplied to the unit for forming selection signals from the fuzzification unit), and the aforementioned numbers for linguistic values (supplied to the unit for question to the rule decoder. The fuzzification unit also supplies, to the rule evaluation unit, values of membership functions of linguistic values whose numbers lie in a closed interval between the aforementioned minimum and maximum numbers. The knowledge base memory supplies numbers for linguistic values for the input variable in question, prescribed by a plurality of rules, to the rule decoder as well as to the unit for forming selection signals. In each case, numbers from the plurality of rules are combined into a rule word, and for each input variable, a dedicated signal block with the rule word for that input variable is generated.

In rule decoder, for a given input variable and for the plurality of rules employed, hit signals are generated identifying whether, and if so which of, the rules are fulfilled with regard to the input variable in question. These hit signals are supplied to the unit for forming selection signals. Additionally, the rule decoder, if necessary, generates a mask signal identifying that an input variable does not occur in a rule, and these mask signals are supplied directly from the rule decoder to the rule evaluation unit. The unit for forming selection signals emits selection signals for a given variable formed dependent on the hit signals, the aforementioned minimum and maximum numbers (which are supplied to the unit for forming selection signals from the fuzzification unit), and the aforementioned numbers for linguistic values (supplied to the unit for forming selection signals directly from the knowledge base memory). The selection signal is supplied to the rule evaluation unit.

In the rule evaluation unit, a weighting factor is generated from the selection signals, the aforementioned values of membership functions (supplied from the fuzzification unit directly to the rule evaluation unit), and, if present, the mask signals. These weighting factors are supplied from the rule evaluation unit to the defuzzification unit.

The rule evaluation unit contains a plurality of first hold elements, an allocation unit, a plurality of OR gates, a plurality of minimum circuits, a plurality of second hold elements, a plurality of drivers, a counter, a read/write memory, and a multiplexer. For each input variable, one value of the aforementioned values of membership functions of the linguistic values whose numbers lie in the closed interval between the minimum and maximum numbers, is buffered in one of the first hold elements, and the output signal from this first hold element is supplied to the allocation circuit. The allocation circuit is supplied with the selection signal, and directs the output of the aforementioned first hold element to one input of one of the OR gates, dependent on the selection signal. If present, the mask signal for the input variable in question is supplied to the other input of the OR gate.

The output of this OR gate is supplied to a first input of one of the minimum circuits, and the output of this minimum circuit is entered, via one of the drivers, into the read/write memory, from which it is available for read out. This output of the minimum circuit is also supplied, via one of the second hold elements, back to a second input of that minimum circuit.

The counter serves for addressing the read/write memory. By means of the multiplexer, the output of one of the drivers can be selected, as the current weighting factor and, in accordance with numbers for linguistic values of the output variables, an aggregation of the current weighting factors is formed by linguistic ORing.

DESCRIPTION OF THE PREFERRED EMBODIMENTS

Figure 1:
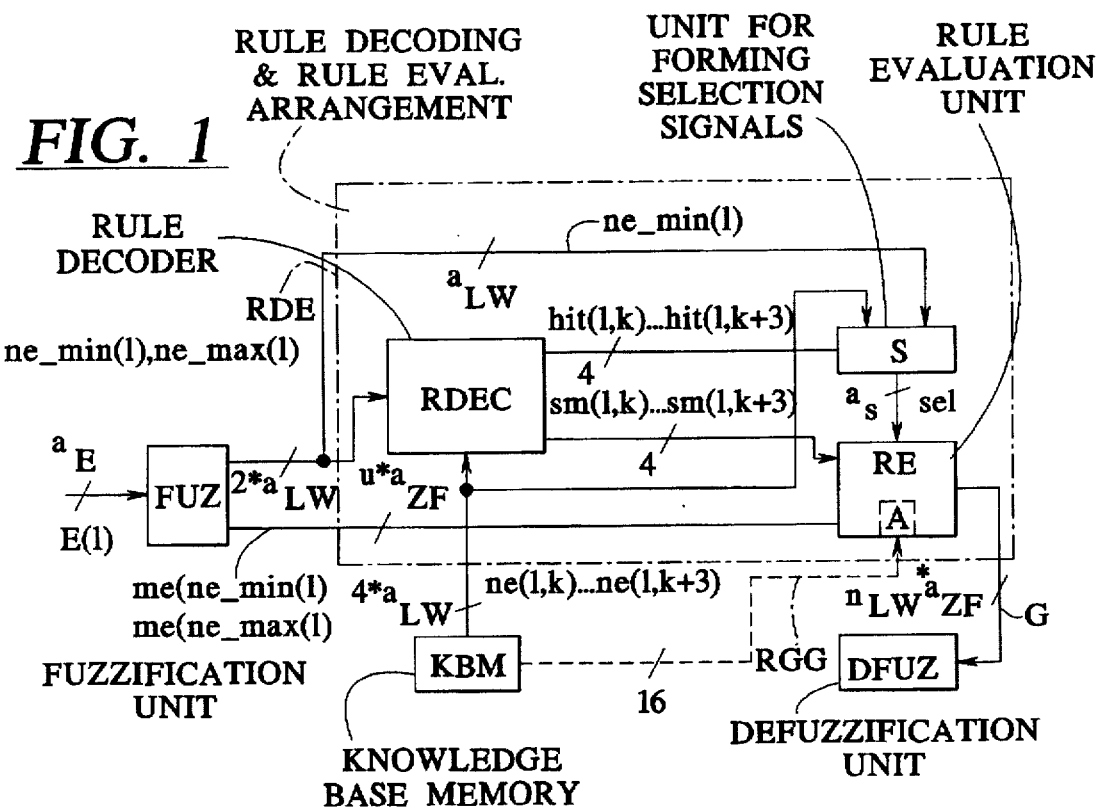
FIG. 1 is a schematic block diagram illustrating the interaction of an arrangement constructed and operating in accordance with the principles of the present invention with other, standard components of a fuzzy inference processor.

FIG. 1 shows, in addition to the arrangement RDE according to the invention for rule decoding and rule evaluation, a fuzzification device FUZ, a knowledge base memory KBM and a defuzzification device DFUZ. The arrangement RDE according to the invention in this case comprises a rule decoder RDEC, a unit S for forming selection signals sel and a rule evaluation unit RE. The rule evaluation unit RE in this case contains a device A, which is shown with a broken line and is optionally provided, for producing numbers for linguistic values of the output variables.

In the fuzzification device FUZ, from active input values E (1) of the respective input variable 1, there are formed a minimum number ne_min (1) of a relevant linguistic value of the respective input variable as well as a maximum number (ne_max (1)) of a relevant linguistic value of the respective input variable, values (me (ne_min (1)) . . . me (ne_max (1)) ) of membership functions of linguistic values whose numbers lie in the closed interval between the minimum and maximum number. If the maximum permissible degree of overlap u is greater than 2, then not only the numbers ne_min (1) and ne_max (1), but a maximum of u numbers in the range between these two numbers are formed. The fuzzification time depends on u and is generally of different length for different input variables. The number ne_min (1) is fed both to the rule decoder RDEC and to the unit S. The number ne_max (1), on the other hand, is fed only to the rule decoder RDEC. The two numbers ne_min (1) and ne_max (1) have a resolution of $a_{LW}$ bits.

The rule decoder RDEC receives, in addition to the numbers from the fuzzification device, numbers ne (1, k) . . . ne (1, k+3) for linguistic values, prescribed in a respective plurality of rules (k, . . . k+3), of the respective input variable 1 from the knowledge base memory KBM. In this case it is important that a plurality (in the exemplary embodiment, four) of rules are processed simultaneously. The numbers from the knowledge base memory likewise have in each case a resolution of $a_{LW}$ bits. In the rule decoder, for a respective input variable E (1) and from a respective plurality of rules, for example from four rules, hit signals hit (1, k) . . . hit (1, k+3) are formed and fed to the unit S. The hit signals hit (1, k). . . hit (1, k+3) are in each case one bit wide and serve for establishing whether, and if so which of, the rules k . . . k+3 are fulfilled with respect to the input variable 1. Furthermore, in the rule decoder RDEC, for the respective input variable 1 and the respective plurality of rules k, . . . k+3, signals sm (1, k) . . . sm (1, k+3) are formed and fed to the evaluation device RE. The signals sm (1, k) ... sm (1, k+3) are in each case one bit wide and serve for masking an input variable which does not occur in a rule.

In addition to the number ne_min (1) from the fuzzification device FUZ, the unit S is also fed the numbers ne (1, k) . . . ne (1, k+3), and selection signals sel are formed in said unit S with a total resolution $a_r$.

The rule evaluation unit RE receives, in addition to the signals sm (1, k) . . . sm (1, k+3), u values me (ne_min (1)) . . . me (ne_max (1)), from which, in said rule evaluation unit, aggregated weighting factors G for a downstream defuzzification unit DFUZ are formed as a function of the selection signals sel. In this case, for each of the $n_{LW}$ linguistic values of the output variables there is formed an aggregated weighting factor with the resolution $a_{ZF}$. The total word width of the weighting factors G is thus $n_{LW}*a_{ZF}$.

The optionally provided device A in the rule evaluation unit RE is supplied by the knowledge base memory KBM with rule group variable words RGG which are, for example, 16 bits wide.

Figure 2:
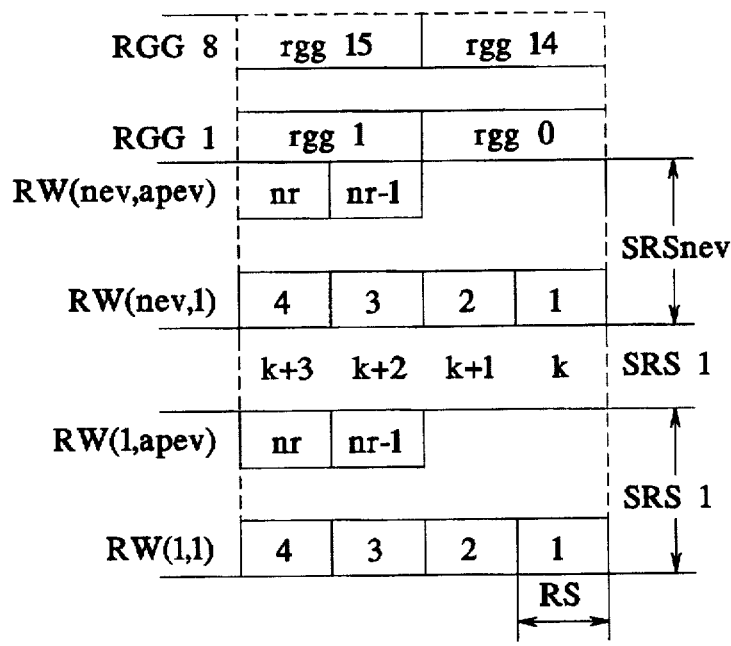
FIG. 2 is a representation for assisting and explaining the memory organization in the arrangement of the invention.

The required memory organization of the knowledge base memory KBM is shown in FIG. 2. In this case, one rule segment RS comprises a number for a linguistic value prescribed for a specific input variable in a rule. For instance, if as here four rules are processed simultaneously, it is advantageous if one rule segment word comprises the corresponding number of rule segments, since in this case particularly simple addressing is possible in the knowledge base memory. The least significant segment is allocated, for example, to the rule k and the most significant rule segment is allocated, for example, to the rule k+3. For each input variable 1, a dedicated set of rule segment words SRS1 is provided which in each case comprises a sufficient number of rule segment words RW(1,1) . . . RW(1, apev), in order to store the numbers for the linguistic values of all the nr rules in respect of the respective input variable 1. Thus, for nev input variables, provision is made in sequence in the memory for sets of rule segment words SRS1 . . . SRS1 . . . SRSnev, for example the rule segment word RW(1,1) of the set of rule segment words SRS1 being addressed by the lowest address and the rule segment word RW(nev, apev) of the set of rule segment words RSnev being addressed by the highest address in the knowledge base memory KBM. Above the last-mentioned address there can be located, for example, a further set of rule segment words which, in a corresponding fashion, contains the numbers for the linguistic values of the output variables. In FIG. 2 an area of memory for rule group variable words RGG1 . . . RGG8 is indicated with a broken line, one rule group variable word here comprising two rule group variables in each case. The rule group variable word RGG1 has, for example, 16 bits, the less significant byte being allocated to the rule group variable rgg0 and the more significant byte being allocated to the rule group variable rgg1. All the rule group variable words up to rule group variable word RGG8 with the rule group variables rgg15 and rgg14 are organized in a corresponding fashion. In each case, one rule group comprises all the rules which have the same linguistic value of the output variables in the consequence part of the respective rule. A zeroth rule group thus contains, for example, all the rgg0 rules which have the zeroth linguistic value of the output variables in the consequence part. In order to permit processing according to rule groups, it is of course necessary for all the rules themselves to be grouped in accordance with the numbers for the linguistic values of the output variables.

Figure 3:
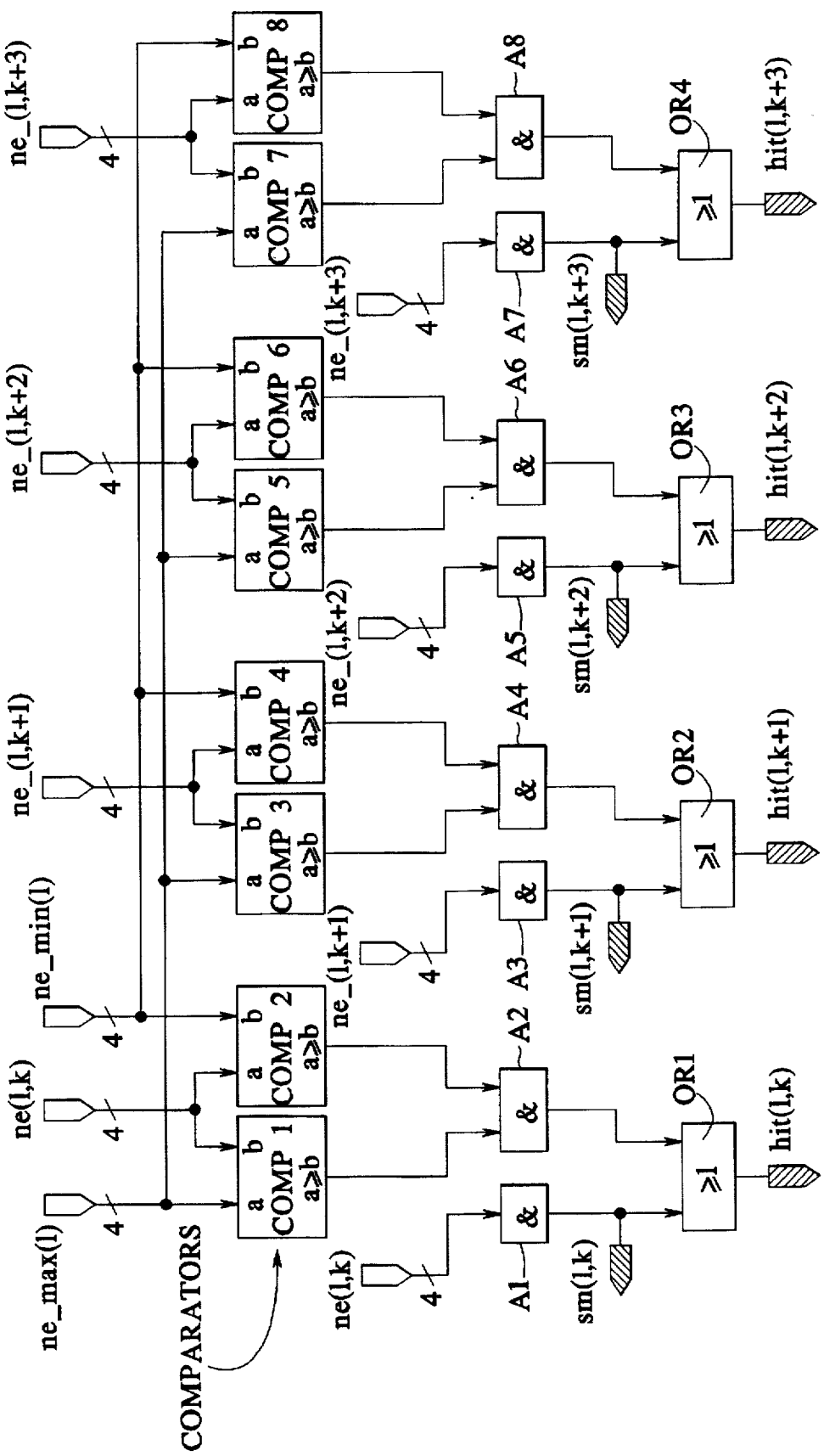
FIG. 3 is a detailed circuit of a rule decoder for the arrangement constructed and operating in accordance with the principles of the present invention.

FIG. 3. shows an advantageous refinement of the rule decoder RDEC, in which four rules k . . .+3 are able to be decoded simultaneously, for example. The rule decoder has, per rule, two greater than/equal to comparators, for example COMP1 and COMP2, two AND gates, for example A1 and A2, and an OR gate, for example OR1. For the simultaneous decoding of four rules, provision is therefore made of a total of eight comparators COMP1 . . . COMP8, eight AND gates A1 . . . A8 and four OR gates OR1 . . . OR4. The comparators COMP1 COMP8 in each case have the comparison condition a greater than or equal to b. In the case of the decoder part for the rule k, the number ne (1, k) for a linguistic value, prescribed in the rule k, of the input variable 1 is fed to a b-input of the comparator COMP1 and to an a-input of the comparator COMP2. The numbers ne (1, k+1) . . . ne (1, k+3) are fed to the comparators COMP3 COMP8 in a corresponding fashion. The a-inputs of the comparators COMP1, COMP3, COMP5 and COMP7 in each case receive the maximum number ne_max (1) of the relevant linguistic values of the input variable 1. The b-inputs of the comparators COMP2, COMP4, COMP6 and COMP8 receive the minimum number ne_min (1) of the relevant linguistic values of the input variable 1. The output signals from the comparators COMP1 and COMP2 are linked by the AND gate A2, the output signals from the comparators COMP3 and COMP4 are linked by the AND gate A4, the output signals from the comparators COMP5 and COMP6 are linked by the AND gate A6 and the output signals from the comparators COMP7 and COMP8 are linked by the AND gate A8. The number ne (1, k) for the linguistic value, prescribed in the rule k, of the input variable 1 is linked bit by bit by the AND gate A1 to form the signal sm (1, k) for masking an input variable which does not occur in a rule. The output signals from the AND gates A1 and A2 are linked by the OR gate OR1 to form a hit signal hit (1, k). For the rules k+1 . . . k+3, corresponding k +3) and the hit signals hit (1, k+1) . . . hit (1, k+3) being formed. By means of the AND circuits A1, A3, A5 and A7, a test is made as to whether a coding 1111 is present for the numbers ne (1, k) . . . ne (1, k+3), which indicates that the input variable 1 does not occur in the respective rules. The output signal from the AND circuit A2, A4, A6 and A8 in each case indicates whether the numbers ne (1, k) of the linguistic values, prescribed in the rules k . . . k+3, of the input variable 1 lie in the closed interval between the minimum number ne_rain (1) and the maximum number ne_max (1) of relevant linguistic values of the input variable 1, the range containing the values ne_min (1) and ne max (1). Since intermediate values between these range limits ne_min (1) and ne_max (1) are possible, the maximum possible degree of overlap u can assume not only the value 2 but also higher values. As a result of the ORing of the output signals from the AND gates, a hit signal, for example hit (1, k), is thus produced if, for example, the number ne (1, k) lies in the range specified above or if the input variable does not occur in the rule k.

Figure 4:
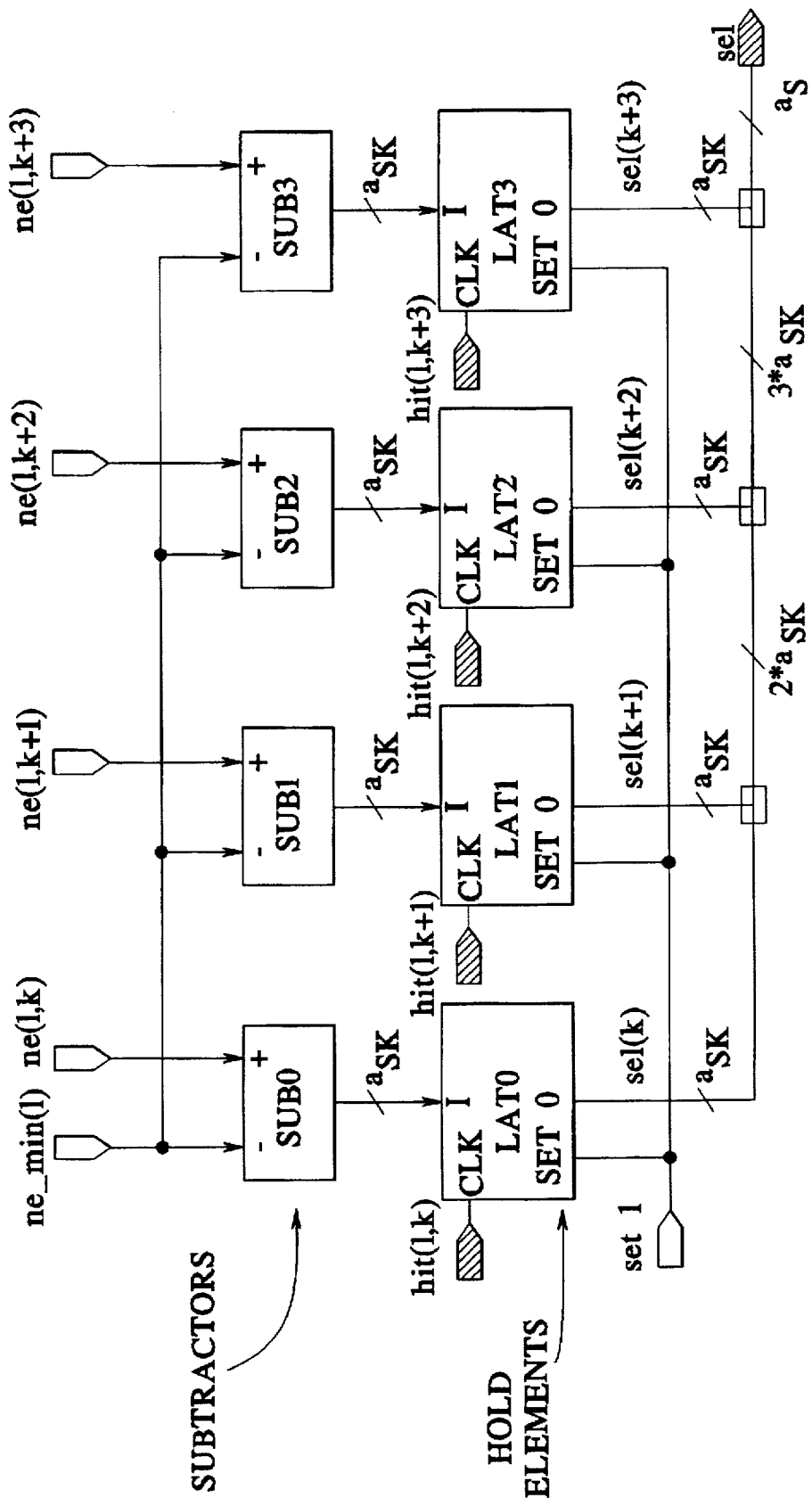
FIG. 4 is a detailed circuit of a unit for forming selection signals of the arrangement constructed and operating in accordance with the principles of the present invention.

FIG. 4 shows an advantageous refinement of the unit S for forming selection signals sel, in which, for each rule of the plurality of rules k . . . k+3, provision is made in each case of a subtractor and a downstream hold element. The unit S shown in FIG. 4 thus has four subtractors SUB0 . . . SUB3 and four hold elements (latches) LAT0 . . . LAT3. The minimum number ne_min (1) is fed to the subtractors SUB0 . . . SUB3 as the subtrahend. The subtractor SUB0 receives the number ne (1, k) as the minuend, the subtractor SUB1 receives ne (1, k+1) as the minuend, the subtractor SUB2 receives the number ne (1, k+2) as the minuend and the subtractor SUB3 receives the number ne (1, k+3) as the minuend. Since the number ne (1, k) can assume values from ne_min (1) to ne_max (1), provided that the input variable 1 occurs in the respective rules, there results at the output of the subtractors a value range from 0 to u-1, which would correspond to a resolution of Int (1d (u)), Int(x) denoting the smallest natural number $\geq x$. Since, for the case where the input variable 1 does not occur in the respective rule, one bit is likewise necessary, the required resolution $a_{SK}$ is equal to Int (1d (u))+1. For a maximum degree of overlap of u=4, therefore, only an output resolution $a_{SK}$ equals 3 is needed and only the three least significant bits need to be taken into account in each case. The hit signals hit (1, k) . . . hit (1, k+3) serve as clock signals for the hold elements LAT0 . . . LAT3 which, after receiving a respective clock signal, receive a respective output signal sel (k) . . . sel (k+3) of the output signals of the subtractors SUB0 SUB3, the selection signals sel having a total resolution $a_s$ of $4*a_{SK}$. The hold elements LAT0 . . . LAT3 can be set to 1 . . . 1 by means of a set signal SET.

Figure 5:
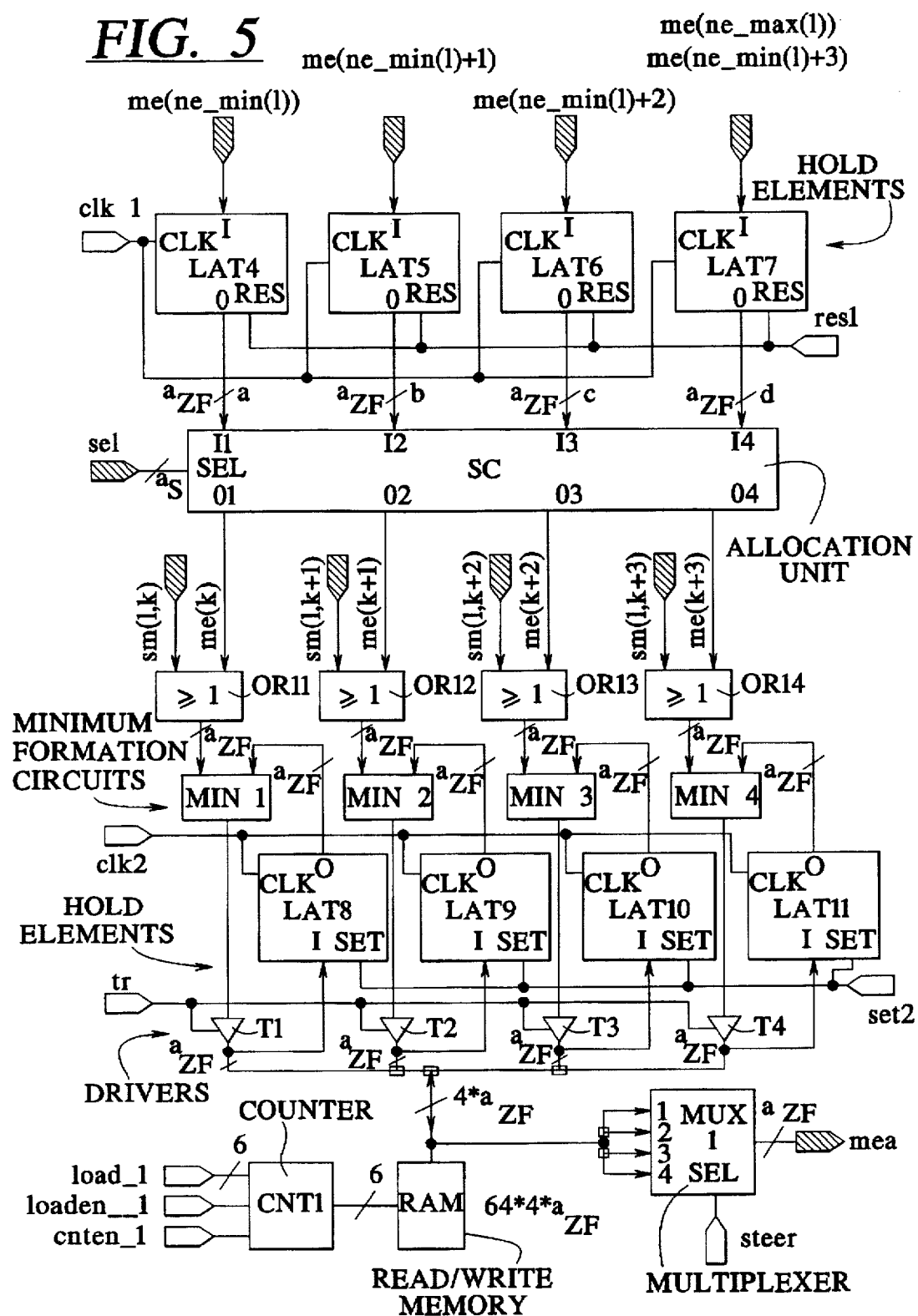
FIG. 5 is a detailed circuit of a first part of a rule evaluation circuit of the arrangement constructed and operating in accordance with the principles of the present invention.

A preferred refinement of a first part of the rule evaluation unit RE is shown in FIG. 5. Since the maximum possible degree of overlap here is, for example, u=4, four hold elements (latches) LAT4 . . . LAT7 are provided for buffering the values me (ne_min (1)) . . . me (ne_min (1)+3), the value me (ne_min (1)+3) being able to represent the value me (ne_max (1)) simultaneously. The hold elements LAT4 . . . LAT7 can be clocked by a common clock signal CLK1 and can be reset by a common reset signal RES1. The outputs of the hold elements LAT4 . . . LAT7 are connected to inputs I1 . . . I4 of an allocation unit SC, and have the resolution $a_{ZF}$. The allocation unit SC now allocates the signals at the inputs I1 . . . I4 or a logic zero to the outputs O1 . . . O4 of the allocation unit SC, as a function of the selection signals sel. The value me (k) of the membership function of the linguistic value which is prescribed by the rule k for the input variable 1 is then present at the output O1. In a corresponding way, the value me (k+1) is present at the output O2, the value me (k+2) is present at the output O3 and the value me (k+3) is present at the output O4. The allocation unit SC comprises four units of identical structure, and operates to set the respective values me(k) through me(k+3) to one of the values at one of the inputs i1 through i4, dependent on the selection signal sel(k). For example the value me (k) receives the value at the input II if the selection signal sel (k) is equal to 000, the selection signal sel (k) is equal to 001, the value me (k) receives the value of the input I3 if the selection signal sel (k) is equal to 010, the value me (k) receives the value at the input I4 if the selection signal sel (k) is 011 and the value me (k) being set equal to 0 if the most significant bit of the selection signal sel (k) is equal to 1, that is to say the input variable 1 does not occur in the rule k. The formation of the values me (k+1) . . . me (k+3) is carried out in a manner corresponding to that in the case of the value me (k). In an OR gate OR11 the value me (k) is now ORed bit by bit with the signal sm (1, k), in an OR gate OR12 the value me (k+1) is ORed bit by bit with the signal sm (1, k+1), in an OR gate OR13 the value me (k+2) is ORed bit by bit with the signal sm (1, k+1) and in an OR gate OR14 the value me (k+3) is ORed bit by bit with the signal sm (1, k+3). As a result, at the output of the OR gates, with regard to a subsequent minimum formation, neutral maximum values 11 ... 1 are present if it is established by means of a respective signal, for example sm (1, k) equals 1, that the input variable 1 does not occur in the rule k. This applies correspondingly to the simultaneously processed rules k+1 ... k+3. The output from the OR gate OR11 is fed to a first input of a minimum circuit MIN1, whose output eignal can be written via a driver T1 into a read/write memory RAM and can be read out from the latter into a hold element LAT8, the output of the hold element LAT8 being connected to the second input of the minimum circuit MIN1. Further minimum circuits MIN2 ... MIN4, hold elements LAT9 ... LAT11 and drivers T2 ... T4 are connected correspondingly. The hold elements LAT8 ... LAT11 can be jointly clocked by a signal CLK2 and can be jointly set by a set signal SET2. The drivers T1 ... T4 can be activated simultaneously by a common driver activation signal tr.

In the event that a set of rules comprises 256 rules, it is possible in each case to process four rules in parallel and the resolution of the membership functions is equal to $a_{ZF}$ bits, therefore a read/write memory RAM having 64 words of $4*a_{ZF}$ bits each is necessary. The 64 words can be addressed by a counter CNT1 having 6 bits, a counter activation signal cnten__1, a load activation signal loaden__1 and a load signal load__1 being able to be fed to the counter CNT1. From the signals which are present at the outputs of the drivers T1 ... T4, with the aid of a multiplexer MUX1, which in this case comprises a one-from-four multiplexer, it is possible to select, as a function of a selection signal STEER, a value mea in the form of a current weighting factor and to feed it to the second part of the rule evaluation unit shown in FIG. 6. In each case for four rules, the previous minimum for the input variables 0 ... 1—1 is read out from the read/write memory RAM into the hold elements LAT8 ... LAT11 and, in the minimum circuits MIN1 ... MIN4, is linked with the values for the current input variable 1, and the new minimum thus formed is written back into the read/write memory.

Figure 6:
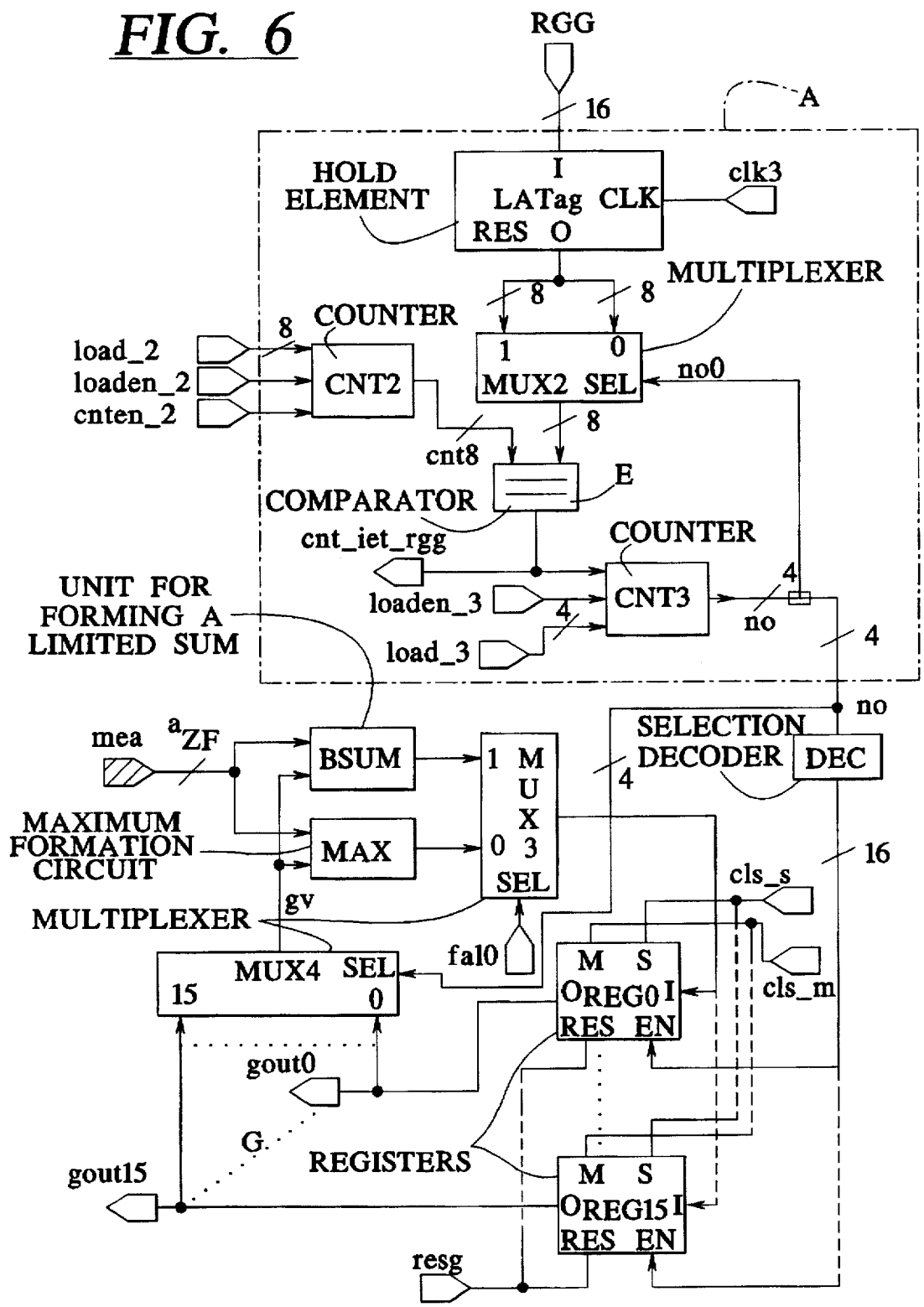
FIG. 6 is a detailed circuit of a second part of a rule evaluation circuit of the arrangement constructed and operating in accordance with the principles of the present invention.

FIG. 6 shows an advantageous refinement of the second part of the rule evaluation circuit RE, which has an optionally provided circuit part A for processing rule group variables.

The circuit part, which is provided in each case, of the second part of the rule evaluation circuit RE provides for aggregation of the current weighting factors mea by means of linguistic ORing, the current weighting factors of rules having the same linguistic value of the output variables being aggregated separately. The linguistic ORing is accomplished by as shown in FIG. 6 by a unit BSUM for forming a limited sum and a maximum circuit MAX, both being able to be supplied with the current weighting factor mea and a previous aggregated weighting factor gv and, with the aid of a multiplexer MUX3, being selected alternatively as a function of a signal fa10. In order to buffer the previous aggregated weights, registers REG0 ... REG15 are provided, which can be selected via a selection decoder DEC by means of the number no for the linguistic values of the output variables. The outputs from the registers REG0 ... REG15 can be fed via a multiplexer MUX4 both to the unit for forming a limited sum and to the maximum circuit, the driving of the multiplexer MUX4 being carried out by means of the number no for the linguistic value of the output variables. The aggregated weighting factors gout0 ... gout15, which can be fed to the defuzzification circuit DFUZ, are present at the outputs of the registers REG0 ... REG15.

If the numbers no of the linguistic values of the output variables are not read from the knowledge base memory but are determined with the aid of the optionally provided circuit part A in FIG. 6 from rule group variables which, as previously explained in more detail, are stored in the knowledge base memory KBM, then a further hold element LATag, a further multiplexer MUX2, an identity comparator E, a rule counter CNT2 and a rule group counter CNT3 are necessary. A respective rule group word RGG having, for example, a 16 bit word width, is written into the hold element LATag and, with the aid of the multiplexer MUX2, alternatively either the less significant byte or the more significant byte is switched through to a first input of the identity comparator circuit E. The second input of the identity comparator circuit E receives the output signal cnt from the rule counter CNT2, to which a counter activation signal cnten__2, a load activation signal loaden__2, and a load signal load__2 can be fed. As soon as the number of rules in a respective group corresponds identically to the rule group variable, a corresponding signal cnt__iet__rgg is produced, which increments the rule group counter CNT3. The rule group counter CNT3 can be loaded by means of a load signal load__3 and a load activation signal loaden__3. Present at the output of the rule group counter is the number for the respective rule group and hence also the number no for the respective linguistic value of the output variable, whose least significant bit no0 is used for controlling the multiplexer MUX2.

Although modifications and changes may be suggested by those skilled in the art, it is the intention of the inventors to embody within the patent warranted hereon all changes and modifications as reasonably and properly come within the scope of their contribution to the art.

What is claimed is:

1. In a fuzzy inference processor having a fuzzification unit which, for each input variable, emits a minimum linguistic value number and a maximum linguistic value number and values of the membership functions of linguistic values that are in a closed interval between said minimum and maximum linguistic value numbers, a knowledge base memory which emits numbers for linguistic values of each input variable prescribed in a plurality of rules stored in said knowledge base memory, and a defuzzification unit that conducts defuzzification dependent on weighting factors applied to a linguistic value of an output variable, the improvement comprising:

a rule decoder supplied with said minimum and maximum linguistic value numbers, a selection signal former supplied with said minimum and maximum linguistic value numbers, and a rule evaluation unit which emits said weighting factors;

said knowledge base memory comprising means for emitting, for each input variable, a linguistic value for said input variable prescribed by said rules;

said rule decoder comprising means for generating a hit signal indicating whether, and if so which of, said rules are fulfilled by said input variable and, if necessary, a mask signal indicating that said input variable does not occur in any of said rules, said hit signal being supplied to said selection signal former and said mask signal being supplied to said rule evaluation unit;

said selection signal former comprising means for forming a selection signal dependent on said hit signal, said minimum and maximum linguistic value numbers, and said rule word and for emitting said selection signal to said rule evaluation unit;

said rule evaluation unit comprising a plurality of first hold elements, clocked by a first clock signal and respectively supplied with said values of said membership functions from said fuzzification unit, an allocation unit, a plurality of two-input OR gates, a plurality of minimum circuits, a plurality of second hold elements clocked by a second clock signal, a plurality of drivers, a counter, a read/write memory addressable by said counter, and a multiplexer, the pluralities of first hold elements, OR gates, minimum circuits, second hold elements and drivers being equal, said plurality of first hold elements comprising, in combination, means for buffering said values of membership functions, one value per first holding element, and for transferring said values of said membership functions to said allocation unit upon said first clock signal, said allocation unit comprising means for allocating said values of said membership functions to one input of a selected one of said OR gates dependent on said selection signal, the other input of each OR gate being supplied with said mask signal, each minimum circuit having a first input connected to an output of one of said OR gates and a second input connected to an output of one of said second holding elements and comprising means for forming a running minimum from said first and second inputs and for supplying said running minimum to one of said drivers, each driver having an output connected to said read/write memory for storage of said running minima therein at respective addresses set by said counter, and also connected to said multiplexer and to one of said second holding elements, said plurality of second holding elements comprising, in combination, means for reading out running minima for a preceding clock cycle of said second clock signal from said read/write memory, one running minima per second holding element, and for transferring said minima from said preceding clock cycle respectively back to said second inputs of the respective minimum circuits, and said multiplexer comprising means for controlled individual emission of said outputs of said drivers as current weighting factors;

means for emitting, to said rule evaluation unit, said linguistic values of said output variables; and said rule evaluation unit further comprising means for aggregating said current weighting factors, for supply to said defuzzification unit, by linguistically ORing current weighting factors for rules having a same linguistic value as said output variable.

2. The improvement of claim 1 wherein said means in said rule decoder for generating a hit signal and a mask signal comprise, for each rule in said plurality of rules:

a first comparator having a first input and a second input and which generates an output signal if said first input is greater than or equal to said second input;

a second comparator having third and fourth inputs which generates an output signal if said third input is greater than said fourth input;

said first input being supplied with said maximum linguistic value number for an input variable, said second and third inputs both being supplied with the linguistic value prescribed by said rules for said input variable, and said fourth input being supplied with said minimum linguistic value number for that input variable;

a first AND gate supplied with said the linguistic value prescribed by said rules for said input variable and having an output comprising said mask signal;

a second AND gate having two inputs respectively connected to the outputs of said first and second comparators, and having an output; and an OR gate having two inputs respectively connected to the outputs of said first and second AND gates, and having an output comprising said hit signal.

3. The improvement of claim 1 wherein said means in said selection signal former for forming said selection signal comprise, for each rule of said plurality of rules:

a subtraction unit in which said minimum linguistic value number for an input variable is subtracted from said the linguistic value prescribed by said rules for said input variable to obtain a difference; and a holding element supplied with said difference and clocked by said hit signal to emit said difference as said selection signal.

4. The improvement of claim 1 wherein said means for emitting said linguistic values of said output variables comprise:

means for generating rule group variable words, each rule group variable word containing two rule group variables of a rule group comprising rules having identical linguistic values;

a hold element into which said rule group variable word is written for, depending on a least significant bit of said linguistic value of said output variable, switching one of said two rule group variables to an output of said holding element;

an identity comparator having a first input connected to the output of said holding element and a second input supplied with an output from said counter, said identity comparator emitting an output signal at an output thereof when said first and second inputs are identical; and a rule group counter connected to the output of said identity comparator, which is incremented by said output signal of said identity comparator, said rule group counter having an output comprising said linguistic value of said output variable.

* * * * *